Figure 2:
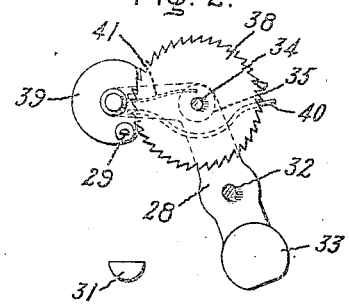

J. T. BEECHLYN.
MAXIMUM DEMAND INDICATOR.
APPLICATION FILED NOV. 11, 1913.

1,239,339.

Patented Sept. 4, 1917.

Witnesses:
George H. Tilden
J. Ellis Glen

Inventor:
John T. Beechlyn,
by Albert G. Davis
His Attorney.

UNITED STATES PATENT OFFICE.

JOHN T. BEECHLYN, OF LYNN, MASSACHUSETTS, ASSIGNOR TO GENERAL ELECTRIC COMPANY, A CORPORATION OF NEW YORK.

MAXIMUM-DEMAND INDICATOR.

1,239,339.  Specification of Letters Patent.  Patented Sept. 4, 1917.

Application filed November 11, 1913. Serial No. 800,300.

*To all whom it may concern:*

Be it known that I, JOHN T. BEECHLYN, a citizen of the United States, residing at Lynn, county of Essex, State of Massachusetts, have invented new and useful Improvements in Maximum-Demand Indicators, of which the following is a specification.

My invention relates to maximum demand indicators and in particular to maximum demand indicators of that general type described in the Letters Patent of Lewis T. Robinson, No. 1,118,444, patented November 24, 1914.

The maximum demand indicator described in the above identified patent comprises broadly a movable member actuated by the rotatable shaft of an electric meter element and adapted to be periodically returned to an initial position, when the member has been moved from such initial position a distance which is substantially a measure of the instantaneous rate of consumption of energy in an electrical installation. In substance, this instrument measures the demand as the representative average rate of consumption of energy during each of a number of time intervals and indicates the maximum measurement. When the consumption of energy in the installation is interrupted the rate of consumption of energy is obviously reduced to zero, and in the type of indicator described in the above identified application the movable member is returned to its initial position. Usually the interruption of the consumption of energy will take place during the interval of measurement of the demand and not at the exact end of any such interval of measurement. The interval of measurement is thus only partially completed when the return of the movable member to its initial position terminates the measurement of the demand for this partial interval, and thus gives a measurement of the demand which is smaller than the actual demand during such partial interval.

The error occasioned in the measurement of the demand by the interruption of the consumption of energy before the time interval for the measurement of the demand has terminated is, of course, in favor of the consumer since it represents a smaller demand than actually existed. While this error under certain conditions of operation may not operate unjustly in favor of the consumer, yet it is very desirable that an instrument be provided in which errors in the measurement of demand due to the interruption of the consumption of energy cannot take place. For example, an installation may be heavily overloaded for an appreciable and substantial length of time and this overload may be sufficiently heavy to blow out the fuses or operate the circuit breakers in the installation during the interval of measurement of this excessive demand with the result that the measured demand for this interval is much less than the actual demand. Again, an unscrupulous consumer can defeat the purposes of a maximum demand indicator by interrupting the consumption of energy in his installation during each interval or period of the measurement of his demand. Other instances in which the interruption of the consumption of energy interfers with the measurement of the demand to the prejudice of the central station management will be apparent to those skilled in the art.

The erroneous measurement of the demand of an electrical installation occasioned by the interruption of the consumption of energy during the interval or period of measurement is not only characteristic of that type of maximum demand indicator described in the aforementioned patent but is also characteristic of all other types of maximum demand instruments with which I am familiar. An object of my present invention is to provide a maximum demand indicator which does not possess this objectionable characteristic. I, accordingly, aim by the present invention to provide a maximum demand indicator in which the movable member is maintained in the position to which it has been moved when the consumption of energy in the installation is interrupted, and is not returned to its initial position until the interval of measurement is fully completed after the consumption of energy has been resumed. In such an indicator a partial measurement of the demand begun before the interruption of the consumption of energy is not destroyed but is preserved until the consumption of energy is again resumed and this partial measurement of the demand is then completed.

While I have heretofore spoken exclusively of the interruption of the consumption of energy in an installation it will be obvious that the same considerations apply to a material and rapid reduction in the rate of consumption of energy. For example, a very sudden and substantial reduction in the rate of consumption of energy has a similar tendency to produce an erroneous measurement of the demand as in the case of the complete interruption of the consumption of energy. For purposes of convenience in explaining my invention I have employed the expression interruption of the consumption of energy throughout the specification and claims of this application, but it will be understood that I intend this expression to cover a material and rapid reduction of the rate of the consumption of energy as well as a reduction of the rate of consumption of energy to zero.

Another object of my present invention is to provide a novel and improved arrangement of mechanical elements for effecting the return of the movable member to its initial position, in the type of maximum demand indicator described in the aforementioned patent of Lewis T. Robinson and another patent of the same inventor, No. 1,159,300, patented Nov. 9, 1915. Further objects of my present invention will be evidenced in the course of the following description.

Figure 1:
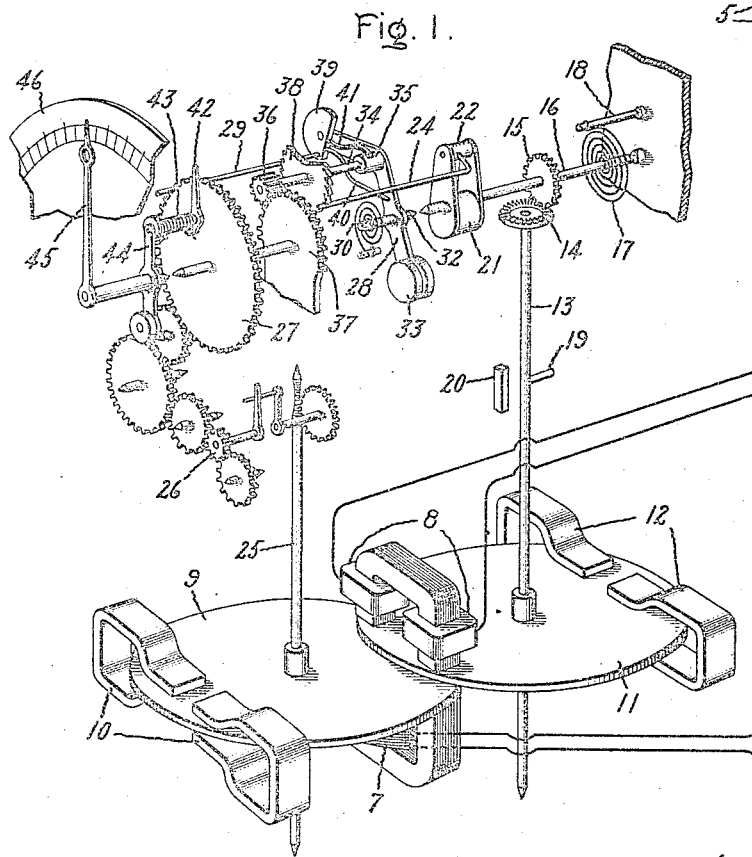
Figure 3:
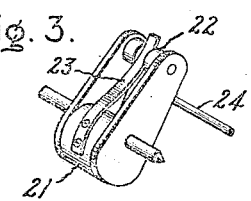

The features of my invention which I consider to be patentably novel are definitely indicated in the claims appended hereto. The construction and mode of operation of a maximum demand indicator embodying the novel features of my invention will be understood from the following description taken in connection with the accompanying drawings in which:

Figure 1 is a diagrammatic view in perspective of a maximum demand indicator embodying the features of my present invention; and Figs. 2 and 3 are views illustrating certain details of construction.

Referring to Fig. 1 of the drawings, there is shown an electrical installation comprising conductors 5 supplying electric energy to translating devices 6. A watthour meter of the induction type is operatively connected in the installation in the usual manner for the purpose of integrating and recording the total quantity of energy consumed in the translating devices. The induction wattmeter comprises the usual series coil 7 and the potential coils 8 which produce a rotary magnetic field proportional to the instantaneous rate of consumption of energy in the well understood manner.

Two rotatable disk armatures are located within the influence of the magnetic field produced by the coils 7 and 8. One of these disk armatures 9 is arranged as the rotatable element of a watthour meter. Permanent magnets 10 are mounted in operative relation to the disk armature 9, so that the revolutions of the armature are directly proportional to the watthours of energy consumed in the translating devices. The second armature 11 is arranged as the movable element of an indicating wattmeter. Permanent damping magnets 12 are operatively associated with the indicating wattmeter armature 11.

A shaft 13 is rigidly secured to the indicating wattmeter armature 11 and carries at its upper end gear member 14. The gear member 14 operatively engages a gear 15 rigidly secured to a shaft 16. A control spring 17 is operatively connected at one end to the shaft 16 and at the other end to a fixed part 18 of the instrument. The control spring is designed to render the movement of the disk armature 11 a measure of the strength of the magnetic field, and thus a measure of the instantaneous rate of consumption of energy in the translating devices of the installation. The zero or initial position of the indicating wattmeter element is determined by an arm 19 secured to the shaft 13 and coöperating with a fixed stop 20. The disk armature 11 moves in a clockwise direction, as viewed from above, upon an increase in the instantaneous rate of consumption of energy in the translating devices 6.

A balanced bifurcated member 21 is secured to the shaft 16, and a cylindrical shaft 22 is pivotally mounted between the bifurcated arms of the member 21. The turning of shaft 22 is resiliently opposed by means of a leaf spring 23 which is fixed at one end to the member 21 and engages at its other end a flattened surface recessed out of the shaft 22. This construction will be best understood by reference to Fig. 3 of the drawings. An offset pin 24 is rigidly secured to the shaft 22 opposite the recessed portion of the shaft. The pin 24 thus moves in response to movements of the indicating wattmeter armature 11, and in addition is capable of radial depression by means of the resilient connection between the shaft 22 and the bifurcated member 21.

A shaft 25 is rigidly secured to the rotatable disk 9 of the watthour meter element. The shaft 25 drives, through gearing 26, the usual registering mechanism of the meter. The registering mechanism has been omitted in the drawings as it forms no part of my invention. The rotatable shaft 25 also drives, through gearing 26 and intermediate gearing, gear wheel 27. The gear wheel 27 is continuously rotated in clockwise direction, as viewed from the front of the instrument, whenever energy is being consumed in the translating devices 6.

A movable member 28, in the form of a counterweighted cross arm, carries at one extreme end an arm or pawl member 29. The pawl member 29 is adapted to engage in the teeth of the gear 27 and in conjunction with this gear it thus constitutes a driving connection between the rotatable shaft 25 and the movable member 28. A spring 30 is operatively connected to the movable member 28 and tends to maintain this member in an initial or zero position and to return the member to such position whenever the driving connection between the rotatable shaft 25 and the member is interrupted. The initial or zero position of the member 28 is determined by the engagement of the pawl member 29 with a fixed stop 31, which is best shown in Fig. 2 of the drawings.

The movable member 28 is rigidly secured to a pivoted shaft 32, and, as heretofore mentioned, is provided at one end with a counterweight 33. The other end of the movable member 28 is bent, as will be best seen in Fig. 2 of the drawings. A shaft 34 is rotatably mounted in a boss 35 rigidly secured at the elbow of the bend in the movable member 28. A pinion 36 is rigidly secured to the shaft 34 and meshes with a stationary gear segment 37. A ratchet or star wheel 38 is also rigidly secured to the shaft 34. A planetary motion is thus imparted to the pinion 36 and ratchet wheel 38 by a movement of the movable member 28.

The pawl member 29 is secured to the extreme end of the bent portion of the movable member 28 by means of a balanced disk segment 39, the disk segment being pivoted to the movable member 28. A trip lever 40 is also secured to the disk segment 39, and when depressed operates to raise the pawl member 29 out of engagement with the teeth of the gear 27. A leaf spring 41 is operatively connected between the disk segment 39 and the boss 35 and serves by its tension to keep the pawl member 29 out of engagement with the teeth of the gear 27. If, however, the pawl member is already in engagement with the teeth of the gear 27 the friction between the pawl member and the teeth of the gear, due to the tendency of the movable member to normally return to its initial position, is sufficiently great to overcome the tension of the spring 41 and the pawl member will thus remain in engagement with the teeth of the gear 27 until this engagement is interrupted by a depression of the trip lever 40.

The remaining details of construction and arrangement of the various elements in my novel maximum demand indicator will be best understood from a description of the operation thereof. When energy is being consumed in the translating devices 6 the disk armature 11 of the indicating wattmeter element and also the pin 24 will assume a position which is always a measure of the instantaneous rate of consumption of energy in the installation. At the same time the gear 27 will be continuously rotated clockwise by the rotatable shaft 25 of the watthour meter element. Assuming that the movable member 28 is in its initial position and that the pawl member 29 is in engagement with the teeth of the gear 27, the movable member 28 will be turned with its pivoted shaft 32 in a clockwise direction. The pinion 36 moving with the member 28 and meshing with the stationary gear segment 37 has a planetary motion which is similarly imparted to the ratchet wheel 38. That is, the pinion 36 and ratchet wheel 38 are simultaneously rotated about the axis of the shaft 34 and also about the axis of the shaft 32.

The ratchet wheel 38 in advancing clockwise with a planetary motion eventually overtakes the pin 24, whereupon the pin engages in the teeth of the ratchet wheel. The paths of movement of the pin 24 and of the ratchet wheel 38 are coincident so that the pin always intercepts the movement of the ratchet wheel. Further progress of the ratchet wheel due to the continued rotation of the shaft 25, results in the radial depression of the pin 24 until it descends upon the trip lever 40. The engagement of the pin 24 with the trip lever 40 moves the pawl member 29 out of engagement with the gear 27 and permits the movable member 28 to return to its initial position by the action of the spring 30, which has a certain amount of initial tension. When the pawl member 29 in its return motion strikes the flattened surface of the stop 31 it is forced into operative engagement with the teeth of the gear 27, whereupon the cycle of operations just described is repeated.

When the return sway of the movable member 28 begins the pin 24 is immediately liberated by the reversed rotation of the ratchet wheel 38. The pawl member, if properly balanced, will by its own inertia keep out of engagement with the teeth of gear 27 during the return sway. I prefer, however, to employ a very light spring acting near the fulcrum of the pivoted pawl member, such as the spring 41 hereintofore described, for assisting in maintaining the pawl member disengaged from the teeth of the gear 27 until reset and retained by the action of the stronger spring 30.

The pawl member extends some distance beyond the gear 27 and is adapted to engage with an arm 42. The arm 42 is resiliently connected, by means of a coil spring 43, with one end of a counterweighted cross arm 44. An indicating member, such as the pointer 45, is secured to the cross arm 44 and is arranged to sweep across a suitable scale 46. The cross arm 44 is spring pressed in the usual manner so that the pointer 45 is resiliently non-returnable, and will thus remain in any position to which it is moved. The pawl member 29 thus operates to move the non-return pointer 17 which indicates the maximum movement of the pawl member and accordingly of the movable member 20 during any one of the number of time intervals in which a measurement of the demand was made.

It will be evident from the foregoing description of the operation of my maximum demand indicator that when the consumption of energy in the installation is interrupted the rotation of the gear 27 will cease. The indicating wattmeter element will start to return to its initial position, and to this end will move until the pin 24 engages with the teeth of the ratchet wheel 38. The mere engagement of the pin with the teeth of the ratchet wheel does not operate to return the movable member 20 to its initial position, therefore, the movable member will remain in the position to which it was moved before the interruption of consumption of energy. If, when the consumption of energy in the installation is again resumed, the instantaneous rate of consumption of energy is great enough the pin 24 will move away from the ratchet wheel 38. The ratchet wheel will thereupon be moved forward and toward the pin 24 by means of the rotation of the shaft 25 and when the ratchet wheel overtakes the pin the movable member will be returned to its initial position as heretofore described. It will thus be seen that a partial measurement of the demand made before the interruption of the consumption of energy is preserved and is combined with a partial measurement of the demand made after the consumption of energy is again resumed. If, after the consumption of energy is resumed, the instantaneous rate of consumption of energy is not sufficiently great to cause the pin 24 to move out of engagement with the ratchet wheel 38 the next few rotations of the shaft 25 will release the pin 24 and actuate the trip lever 21.

While I have explained my invention in this application in connection with a watthour meter it will be evident to those skilled in the art that my invention is not limited to that particular type of meter and may be carried out with any electric meter of the motor type and having a rotatable shaft. It will, accordingly, be understood that where I have used the terms and expressions wattmeter and rate of consumption of energy that I intend to cover thereby any electric meter of the motor type and a corresponding equivalent expression for the consumption of energy, as for example, an ampere hour meter, and the rate of flow of current, that is the number of amperes flowing, in the installation.

Numerous modifications in the details of construction of my improved maximum demand indicator will be evident to those skilled in the art. As heretofore stated, while I have described my invention for the purposes of illustration, embodied in an instrument of the induction meter type having all of its operative elements actuated by the same field coils it will be obvious that my invention is not limited to an instrument of this particular type or to an instrument in which the watthour meter element and the wattmeter element are actuated by the same field coils. I do not, therefore, desire to be limited to the specific construction which I have here described but I aim by the appended claims to cover all modifications which are within the spirit and scope of my invention.

What I claim as new and desire to secure by Letters Patent of the United States is:—

1. A maximum demand indicator comprising in combination means for obtaining a measure of the demand made by an electrical installation upon a source of electric energy supply during each of a number of intervals of time, means for indicating the maximum demand as measured during any one of the time intervals, and means included in said first mentioned means whereby a partial measurement occasioned by an interruption of the demand of said installation upon said source for any fraction of the time interval of measurement is continued when said installation again makes a demand upon said source.

2. A maximum demand indicator comprising in combination a watthour meter having a rotatable shaft, a movable member having an initial position and adapted to be operatively connected to said rotatable shaft, means for returning said movable member to its initial position when it has been moved from its initial position a distance which is substantially a measure of the demand made by an electrical installation upon a source of electric energy supply, and means included in said first mentioned means whereby the return of said movable member to its initial position is prevented when the demand of said installation upon said source is interrupted regardless of the length of time such demand remains interrupted.

3. A maximum demand indicator comprising in combination a watthour meter having a rotatable shaft, a movable member having an initial position and adapted to be operatively connected to said rotatable shaft, means for returning said movable member to its initial position when it has been moved from its initial position a distance which is substantially a measure of the rate of consumption of energy in an electrical installation, and means included in said first mentioned means whereby said movable member is maintained in the position to which it has been moved by the rotatable shaft when the demand made by said installation upon its source of electric energy supply becomes zero regardless of the length of time such demand remains zero.

4. A maximum demand indicator comprising in combination a watthour meter having a rotatable shaft, a movable member having an initial position and adapted to be operatively connected to said rotatable shaft, means for returning said movable member to its initial position when it has been moved from its initial position a distance which is substantially a measure of the rate of consumption of energy in an electrical installation, and means included in said first mentioned means for preventing the return of the movable member to its initial position when the demand of the installation upon its source of electric energy supply becomes zero provided the distance the movable member has moved from its initial position is insufficient to be substantially a measure of the rate of consumption of energy at the instant before the demand of the installation becomes zero.

5. A maximum demand indicator comprising in combination a movable member having an initial position, means for moving said member, means for returning said member to its initial position when the distance the member has moved from its initial position is substantially a measure of the rate of consumption of energy in an electrical installation, means for preventing the return of the movable member to its initial position when the consumption of energy in the installation is interrupted provided the distance the movable member has moved from its initial position when the energy consumption is interrupted is insufficient to be substantially a measure of the rate of consumption of energy at that instant, and means included in said last mentioned means whereby the movable member must be forwardly moved a predetermined minimum distance after any interruption of the energy consumption before said member can be returned to its initial position.

6. A maximum demand indicator comprising in combination a movable member having an initial position, means for moving said member, means for returning said member to its initial position when the distance the member has moved from its initial position is substantially a measure of the rate of consumption of energy in an electrical installation, means included in said last mentioned means whereby said movable member is maintained in the position to which it has been moved when the demand of the installation upon its source of electric energy supply is interrupted and until the installation again makes a demand upon its source regardless of the length of time the demand of the installation remain interrupted, and means for indicating the maximum movement of said movable member.

7. A maximum demand indicator comprising in combination a movable member having an initial position, means for moving said member, means for returning said member to its initial position when the distance the member has moved from its initial position is substantially a measure of the rate of consumption of energy in an electrical installation, means for indicating the maximum movement of said movable member, and means whereby said movable member, is maintained in the position to which it has been moved when the demand of the installation upon its source of electric energy supply is interrupted and is not returned to its initial position until the distance of the member from its initial position is substantially a measure of the rate of consumption of energy after the installation again makes a demand upon its source.

8. A maximum demand indicator comprising in combination a watthour meter element having a rotatable shaft, a movable member adapted to be operatively connected to said rotatable shaft, a wattmeter element, a pin operatively related to said wattmeter element, a ratchet wheel, said pin and said ratchet wheel being arranged for relative movement in a coincident path, means whereby the operative connection between said rotatable shaft and said movable member is interrupted and the movable member is returned to an initial position when said pin engages with said ratchet wheel, and means for indicating the maximum movement of said movable member.

9. A maximum demand indicator comprising in combination a watthour meter element having a rotatable shaft, a movable member adapted to be operatively connected to said rotatable shaft, a ratchet wheel adapted to be rotated by said rotatable shaft, means controlled by a wattmeter element for moving a pin into engagement with the teeth of said ratchet wheel whereby further rotation of said ratchet wheel by said rotatable shaft interrupts the operative connection of said movable member with said rotatable shaft, means for returning said movable member to an initial position when the operative connection between the member and the shaft is interrupted, and means for indicating the maximum movement of said movable member.

10. A maximum demand indicator comprising in combination a watthour meter element having a rotatable shaft, a movable member having an initial position, a driving connection between said rotatable shaft and said movable member, a ratchet wheel operatively related to said driving connection and adapted to interrupt said driving connection, means whereby said ratchet wheel interrupts said driving connection when said movable member has been moved from its initial position a distance which is substantially a measure of the rate of consumption of energy in an electrical installation, means for returning said movable member to its initial position when the driving connection between the member and the shaft is interrupted, and means for indicating the maximum movement of said movable member.

11. A maximum demand indicator comprising in combination a watthour meter element having a rotatable shaft, a movable member having an initial position, a driving connection between said rotatable shaft and said member, a ratchet wheel adapted to be moved by said rotatable shaft, means for moving a pin into engagement with the teeth of said ratchet wheel when said movable member has been moved from its initial position a distance which is substantially a measure of the rate of consumption of energy in an electrical installation, means whereby a further movement of said ratchet wheel by said rotatable shaft after said pin has engaged in the teeth of the ratchet wheel interrupts the driving connection between said rotatable shaft and said movable member, means for returning said movable member to its initial position when the driving connection between the member and the shaft is interrupted, and means for indicating the maximum movement of said movable member.

12. A maximum demand indicator comprising in combination a watthour meter element having a rotatable shaft, a movable member having an initial position, a driving connection between said rotatable shaft and said movable member, a ratchet wheel secured to said movable member and arranged for planetary motion, an indicating wattmeter element adapted to always occupy a position which is substantially a measure of the rate of consumption of energy in an electrical installation, a pin operatively connected to said indicating wattmeter element and having a path of movement coincident with the path of movement of said ratchet wheel, means whereby the engagement of said ratchet wheel with said pin interrupts the driving connection between said rotatable shaft and said movable member, means for returning said movable member to its initial position when the driving connection between the member and the shaft is interrupted, and means for indicating the maximum movement of said movable member.

13. A maximum demand indicator comprising in combination an electric meter element having a rotatable shaft, a movable member having an initial position, means operatively connecting said movable member to said shaft, means for periodically returning said movable member to its initial position, and means included in said last mentioned means whereby the movable member must be forwardly moved after any interruption of the energy consumption before said member can be returned to its initial position.

14. A maximum demand indicator comprising in combination an electric meter element having a rotatable shaft, a movable member having an initial position, means operatively connecting said movable member to said shaft, a tripping device adapted to operatively disconnect said member from said shaft, means positively actuated by the rotation of said shaft for operating said tripping device, and means for returning said movable member to its initial position each time said tripping device is operated.

In witness whereof, I have hereunto set my hand this 29th day October, 1913.

JOHN T. BEECHLYN.

Witnesses:
JOHN A. McMANUS, JR.,
FRANK G. HARTIE.